UNITED STATES PATENT OFFICE.

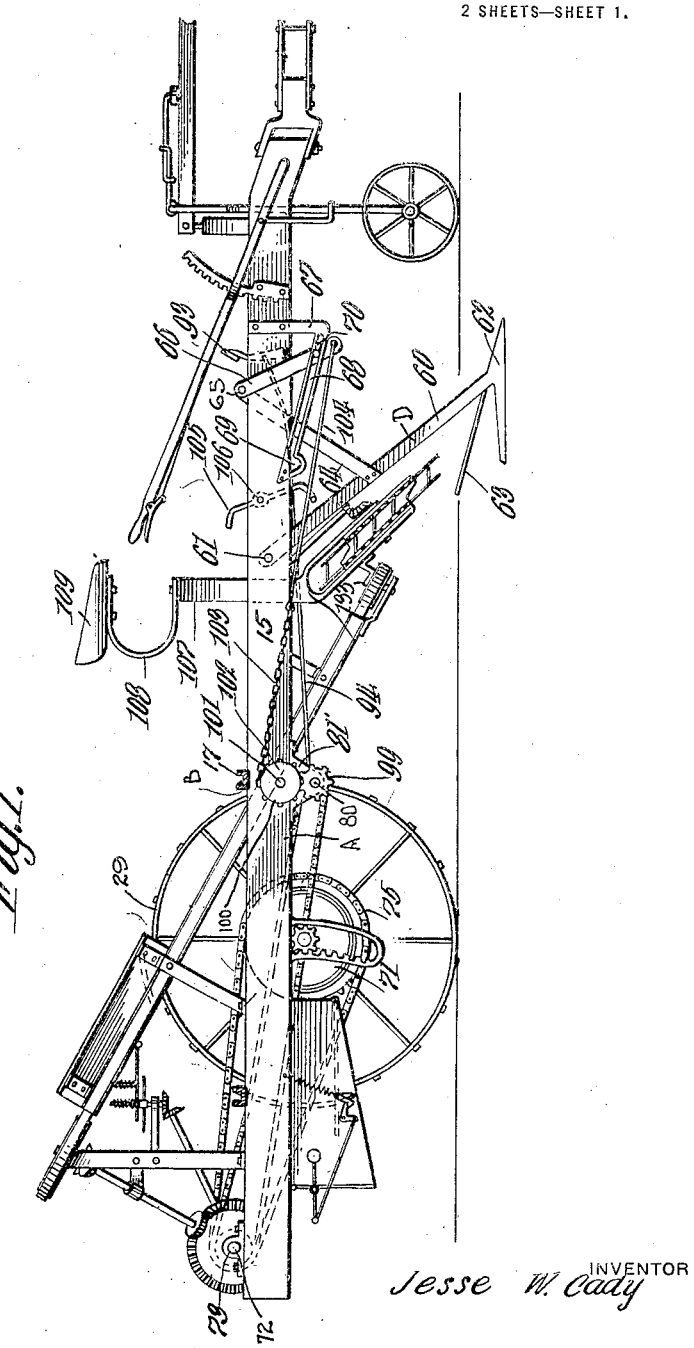

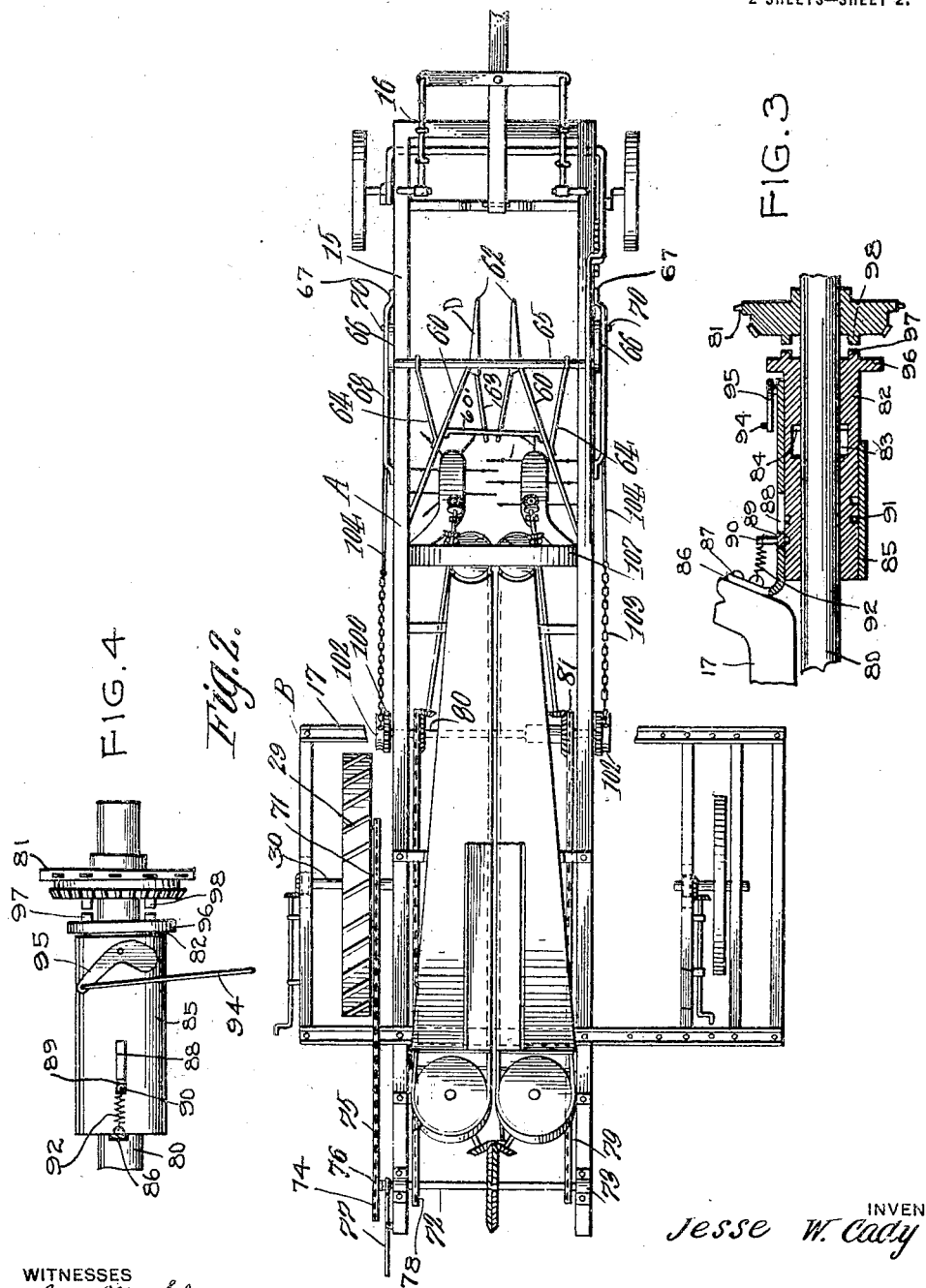

JESSE W. CADY, OF BELLE FOURCHE, OF SOUTH DAKOTA.

BEET-HARVESTER.

1,354,534.   Specification of Letters Patent.   Patented Oct. 5, 1920.

Application filed August 14, 1918. Serial No. 249,895.

*To all whom it may concern:*

Be it known that I, JESSE W. CADY, a citizen of the United States, residing at Belle Fourche, in the county of Butte and State of South Dakota, have invented certain new and useful Improvements in Beet Harvesters, of which the following is a specification.

This invention relates in general to beet harvesters and more particularly to a plow for such devices, the plow being constructed to facilitate its movement to either an operative or an inoperative position.

Another object of this invention is the production of a plow for a beet harvester which is pivotally carried upon the main frame and is provided with link connections associated with means for drawing upon the link connections for elevating the plow to an inoperative position although the link connections may be released to permit the plow to again move to an operative position.

A still further object of this invention is the production of a plow for a beet harvester which is provided with link connections, the link connections also being provided with means to engage guiding frames whereby as the link connections are moved they will lift the plow to an inoperative position although when the link connections are released the plow will again be permitted to move to an operative position.

One practical form of construction and assembly of the present invention will be hereinafter described and is illustrated in the accompanying drawings, in which—

Figure 1 is a side elevation of the beet harvester, showing the same in condition for use.

Fig. 2 is a top plan view of the beet harvester.

Fig. 3 is a longitudinal section through the structure which is used for transmitting power for raising the plow to an inoperative position.

Fig. 4 is a top plan view of the structure as illustrated in Fig. 3.

In the preferred embodiment of the present invention, about to be described, it will be seen that the harvester comprises a main frame indicated in general at A. This main frame is formed preferably of parallel angle irons 15 having a connection 16 at their forward ends.

An auxiliary frame is indicated in general at B and is formed of parallel channel irons 17 extending transversely across the angle irons 15 of the main frame A, as illustrated clearly in Fig. 2.

The drive wheel 29 is rotatably mounted upon the shaft 30, as illustrated in Fig. 2.

The lifting mechanism includes a pair of plows, this lifting mechanism being indicated in general at D. Each plow comprises a standard 60 which is pivotally mounted as indicated at 61 upon one of the side angle irons 15 of the main frame A. The plow point 62 is formed and carried upon the lower end of the standard 60 and is provided with a guiding extension 63, as shown clearly in Figs. 1 and 2. It is therefore obvious that when these two plows are in position, the plow points 62 will be spaced apart, thus permitting the points to pass upon each side of a row of beets, thus lifting the beets and guiding the same rearwardly through the guide extensions 63. Links 64 are fixedly mounted upon the standards 60 intermediate their ends, as illustrated in Fig. 1 and these links 64 project beyond the upper portions of the angle irons 15 of the main frame A. The transversely extending shaft 65 is connected to the upper ends of the links 64 and the ends of this shaft project beyond the side portions of the main frame A. The links 66 are pivotally mounted upon the projecting ends of the shaft 65, and these links extend downwardly for a distance below the lower portions of the frame A. A guide frame is secured upon each side of the main frame and each guide frame comprises a vertical projection 67 mounted upon the angle irons 15 of the main frame A and from the lower end of each projection there extends a slotted guide 68. This slotted guide 68 has a depressed pocket 69 formed at its upper end for the purpose to be hereinafter set forth.

It will be noted that each link 66 is provided with a pin 70 fitting within the slotted guide 68 of the supporting frame 67. In order to shift the plows to inoperative positions, there is provided a certain driving mechanism which consists of the sprocket wheel 71 positioned in any suitable manner upon the drive wheel 29. The shaft 72 is carried by the brackets 73 upon the rear ends of the angle irons 15 of the main frame A, as shown in Fig. 2 and the sprocket 74 is loosely mounted upon one end of this shaft 72. A chain 75 passes around the sprocket 71 and also around the sprocket 74, thus causing rotary motion to be imparted to the sprocket 74 when the drive wheel 29 is rotating.

In order to permit rotary motion to be imparted to the shaft 72, a sectional clutch 76 is carried by the sprocket 74 and is also keyed upon the shaft 72, one section of the clutch being held in engagement with the remaining section of the clutch by the lever 77. The manner in which this clutch is carried is of the usual construction and for this reason it is not thought necessary to further describe the detail construction of the same. It is intended however, that when the clutch is in an engaged condition, as illustrated in Fig. 2, rotary motion shall be imparted to the shaft 72. Sprockets 78 are keyed upon the shaft 72 and these sprockets 78 have endless chains 79 extending therearound. A driven shaft 80 is mounted upon the bearing blocks 81' mounted upon the angle irons 15 of the main frame A. Sprockets 81 are loosely mounted upon the driven shaft 80 and for this reason when the shaft 72 is rotated, rotary motion will be imparted to the sprockets 81, since the endless chains 79 pass around the sprockets 81.

The sliding clutch aids for performing the actuation of the plows, when it is desired to move the plows to an inoperative position, as shown in Figs. 3 and 4. This clutch comprises a sleeve like structure 82 mounted upon the driven shaft 80. This sleeve is provided with internal alined grooves 83, in which the projecting ends of the pin 84 fit. This pin extends through the driven shaft 80 so that when the sleeve-like clutch is rotated, rotary movement will be imparted to the driven shaft 80. In order to support this sleeve-like clutch 82, there is provided a casing 85 fitting therearound, and this casing 85 is provided with a strip 86 fixedly mounted as indicated at 87 upon the central portion of one of the channel irons 17 of the auxiliary frame B. The casing 85 is provided with a longitudinal slot 88 in which fits a movable plate 89. The pin 90 extends through the plate 89 and extends into the selected diagonally extending annular groove 91 as shown in Fig. 3. A coil spring 92 is secured at one end to the pin 90 and at its opposite end to one of the securing elements 87 of the strip 86, thus normally urging the sleeve 82 in one direction. This spring will therefore hold the sleeve from accidental engagement with the driving element, whereby the clutch will be held from accidentally operating.

When however, it is desired to move the plow to an inoperative condition, the operator pushes upon the foot pedal 93, this pedal 93 being pivotally supported adjacent the forward end of the main frame A. A rod 94 is connected at one end to the foot pedal 93, as indicated in dotted lines in Fig. 1, while the rear end of this rod 94 is pivotally connected to the cam 95, as illustrated clearly in Fig. 4. This cam 95 is pivotally mounted upon the upper portion of the casing 85 and is adjacent the head 96 of the clutch 82. This head 96 is provided with lugs 97 thereon and the lugs 97 are adapted to engage lugs 98 on the inner surface of the sprocket 81.

Pinions 99 are keyed upon the ends of the driven shaft 80 which project beyond the ends of the blocks 81'. Pinions 100 are carried upon the shaft 101 carried by the angle irons 15 of the main frame A. These pinions 100 mesh with the pinions 99 and for this reason when the pinions are rotated, rotary motion will be imparted to the pinions, 100. Spools 102 are secured to the pinions 100, as shown in Fig. 2. The chains 103 are connected to the spools 102 and are also connected to the rear ends of the connecting rods 104. These rods 104 have their forward ends connected to the lower ends of the links 66, as shown in Fig. 1.

When it is desired to lift the plows to an inoperative position, the operator pushes upon the foot pedal 93, which causes the rod 94 to swing the cam 95. The cam 95 will come into engagement with the head 96 of the sleeve-like clutch and will for this reason move the lugs 97 of the clutch into engagement with the lugs 98 of the sprocket 81. At this time the rotary motion being imparted to the sprocket 81 by the driving mechanism hereinbefore specified will cause the clutch-like sleeve 82 to be rotated. As the sleeve is rotated, it will in turn rotate the driven shaft 80, thus causing the pinions 99 to rotate the pinions 100. As these pinions are rotated the spools 102 will wind the chains 103 thereon, thus drawing upon rods 104. These rods being pulled upon, it is obvious the pins 70 will ride upwardly in the slotted guides 68, thus moving the upper end of the links 64 upwardly and in this way swinging the plows upwardly.

When the pins 70 arrive at the upper ends of the slotted guides 68, they will then pass into the pockets 69, thus preventing the pins from again accidentally moving downwardly toward the lower ends of the guides for allowing the plows to accidentally move into engagement with the surface over which the harvester is passing. When the pins arrive at the upper end of the slots, the operator then releases his foot from the pedal 93 and the spring 92 will slide the sleeve 82 of the clutch to cause the lugs 97 to disengage the lugs 98, whereupon rotary motion of the driven shaft 80 will discontinue.

When the operator has again arrived at a place where he desires to have the plows dig into the earth, he then presses upon the outer end of the levers 105, which are pivotally mounted as indicated at 106, upon the angle irons 15 of the main frame A. This action will cause the lower ends of these levers 105 to be swung upwardly into engagement with the lower ends of the links 66, whereby the links will be raised for lifting the pins out of the pockets 69. The pins will then move downwardly within the slotted guides 68, due to the weight of the plows and in this way the plows will be in position to move back into their normal condition, while the rods 104 will pull upon the chains and unreel the chains, since such action would be allowed by the free rotation of the driven shaft 80, as it will not be interfered with by the clutch which at this time is in an inoperative position.

The arch 107 is fixedly mounted upon the angle irons 15 of the main frame A and supports the element 108 carrying the seat 109.

When this device is in operation, it is obvious any suitable motive power may be applied to the draft pole, for it is not absolutely necessary to provide whiffle trees since a tractor or other engine may be used for this purpose. When the field in which the harvester is to be used has been reached, the lever 77 may be shifted so as to cause the shaft 72 to operate and at this time the pinions will be actuated. The operator may then release the plows in the manner specified and due to the force of gravity they will pass down to dig into the earth and thus lift the beets which pass therebetween.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

It will be noted that a reinforcing bar 60' is employed for reinforcing the plows.

What is claimed is:—

1. In a device of the class described, the combination of a main frame, a plow pivotally mounted upon said frame, a link fixed upon said plow, a link pivotally connected to said last mentioned link, a guide frame connected to said main frame, said guide frame having a receiving pocket, a pin carried by said last mentioned link, means for drawing upon said last mentioned link, thus causing the pin to be moved along said guide frame for pulling said first mentioned link and moving the plow to an inoperative position, said pin fitting within said pocket to hold said plow against accidental movement, and means for engaging said last mentioned link to move said pin from said pockets, thus permitting the links to return to their normal positions and said plow to move to an operative position.

2. In a device of the class described, the combination of a frame, a plow pivotally mounted upon said frame, a guide frame carried upon said main frame, said guide frame having an inclined slotted portion, said inclined slotted portion having a pocket at its upper end, a link fixed to said plow, a shaft connected to said link, a link connected to said shaft, a pin carried upon said last mentioned link and fitting within the slotted guide, means for drawing upon said last mentioned link, thus causing the pin to ride within the slotted guide to pull upon the first mentioned link and move said plow to an inoperative position, said pin being adapted to pass into said pocket thus holding the plow against accidentally moving to an operative position, and a lever pivotally mounted upon said frame for engaging said last mentioned link, thus permitting the last mentioned link to be shifted to move said pin from said pocket and allow the plow to return to an operative position.

In testimony whereof I affix my signature in presence of two witnesses.

JESSE W. CADY.

Witnesses:
H. E. RICH,
C. JOE PAULSON.